US012179959B2

(12) United States Patent
Huertas

(10) Patent No.: US 12,179,959 B2
(45) Date of Patent: Dec. 31, 2024

(54) METHOD FOR PREPARING A PAPER WEB WITH A COMPOSITE PAPER MESH FOR USE TO PRODUCE BAGS, AND COMPOSITE PAPER MESH

(71) Applicant: Cristobal Meseguer, S.A., Murcia/Beniajan (ES)

(72) Inventor: Jose Maria Meseguer Huertas, Beniajan (ES)

(73) Assignee: Cristobal Meseguer, S.A., Beniajan (ES)

( * ) Notice: Subject to any disclaimer, the term of this patent is extended or adjusted under 35 U.S.C. 154(b) by 142 days.

(21) Appl. No.: 18/019,135

(22) PCT Filed: Jul. 27, 2021

(86) PCT No.: PCT/ES2021/070567
§ 371 (c)(1),
(2) Date: Feb. 1, 2023

(87) PCT Pub. No.: WO2022/049313
PCT Pub. Date: Mar. 10, 2022

(65) Prior Publication Data
US 2023/0278755 A1    Sep. 7, 2023

(30) Foreign Application Priority Data
Sep. 7, 2020 (ES) .................................. 202030907

(51) Int. Cl.
*B65D 33/01* (2006.01)
*B31B 70/82* (2017.01)
(Continued)

(52) U.S. Cl.
CPC ............ *B65D 33/01* (2013.01); *B31B 70/826* (2017.08); *B65D 33/04* (2013.01); *B65D 85/50* (2013.01); *D21F 11/16* (2013.01); *B31B 2155/00* (2017.08)

(58) Field of Classification Search
CPC ................ B29C 65/18; B29K 2079/08; B29K 2105/0002; B29K 2105/0085; C08L 9/06;
(Continued)

(56) References Cited

U.S. PATENT DOCUMENTS 3,269,643 A * 8/1966 Mcdowell ............. B32B 29/005
                                                        156/290
3,674,607 A * 7/1972 Allport ..................... D04H 3/04
                                                        118/247
(Continued)

*Primary Examiner* — James D Sells
(74) *Attorney, Agent, or Firm* — Phillips Lytle LLP; David L. Principe

(57) ABSTRACT

The present invention discloses a method for preparing a paper band that incorporates a composite paper mesh, intended for the manufacture of bags for horticultural products, wherein the embodiment of the composite mesh comprises a process that includes dividing a paper reel (1) into continuous longitudinal strips (2-5), transversely segmenting a paper reel (6) to prepare cross pieces (7) which are applied on two longitudinal strips (2-5) parallel and spaced apart from each other, in successively distant positions along said strips and bonded by gluing, and applying on the support base grid structure thus obtained a mesh (10) of paper yarn which is joined to the support base by gluing, and that can be divided into portions that can be used for covering windows or openings included in the paper band, all this with the aid of automated means.

6 Claims, 4 Drawing Sheets

(51) Int. Cl.
    *B65D 33/04*          (2006.01)
    *B65D 85/50*          (2006.01)
    *D21F 11/16*          (2006.01)
    *B31B 155/00*        (2017.01)

(58) Field of Classification Search
    CPC .............. C08L 2205/00; C08L 2205/06; C08F
                     212/08; B65D 33/01; B31B 2155/00;
                             B31B 70/826; D21F 11/16
    USPC ........................................................ 156/250
    See application file for complete search history.

(56)              References Cited

U.S. PATENT DOCUMENTS 4,297,402 A  *  10/1981  Kinbara ................. B32B 27/10
                                                               428/34.3
2005/0260904 A1*  11/2005  Shepherd ............... B32B 27/02
                                                               442/76

* cited by examiner

METHOD FOR PREPARING A PAPER WEB WITH A COMPOSITE PAPER MESH FOR USE TO PRODUCE BAGS, AND COMPOSITE PAPER MESH

TECHNICAL FIELD OF THE INVENTION

The present invention relates to a method for preparing a paper band of those used as a starting base for the manufacture of bags, namely bags typically used for containing and transporting products or articles of any kind, and in a very preferable manner horticultural products, wherein the paper band provided by the invention conventionally includes windows or openings which are protected with a composite mesh innovatively obtained from paper that is twisted with natural fibres added to increase the specific strength of the composite paper mesh, and hence of the bag manufactured from the paper band with the composite mesh incorporated.

The invention also relates to a composite mesh, manufactured from paper that is twisted with added natural fibres or even, optionally, using only natural fibres (for example, bamboo or cotton), obtained by means of an automated process and intended to be fragmented, also in an automated manner, into a multiplicity of segments of previously established size, for the application of each of these sections to each respective one of the openings which, in a conventional manner, includes the said paper band used in the manufacture of the bags, for the purpose of covering and protecting said openings, The technical field in which the present invention falls within is comprised within the industrial sector dedicated to the manufacture of bags for the packaging of products of any kind, and in a more particular manner, as previously announced, for packaging and transporting horticultural products.

BACKGROUND OF THE INVENTION

As is well known, plastic materials are one of the main causes of pollution worldwide due to the extensive use of this material in all productive sectors. Plastic is present in a wide variety of processes, because apart from the well-known use in the manufacture of many types of packaging, it also finds application in other industries such as textile production, cosmetic ingredients, construction, the toy industry, and in a multitude of commonly used utensils and objects. According to known and published data, during the past year 2019 the global production of plastic reached the figure of 359 million tons, which, once the material has been used and discarded, is mostly dumped into the environment and with the particularity that a significant portion of these discharges reaches rivers and seas, generating pollution in crops, animals, marine environment, etc., such that it can be said that plastic has flooded the seas and also our daily lives. Although some processes have been developed to recycle some plastic materials, the truth is that these processes are insufficient and most of the waste of this material that is dumped in nature, generates pollution that is estimated to take between 150 years to degrade, as would be the case of a common plastic bag, and 1000 years as in the case of a PET bottle.

Clearly, this is a very important problem that is widespread worldwide, for which it is necessary to find solutions that allow, day by day, said plastic material to be progressively replaced by a more environmentally friendly material that avoids, as far as possible, causing damage to the environment.

To achieve this objective, one of the materials that finds most applications at the industrial level is paper, either in its simplest conception or in a more elaborate way, such as in the form of cardboard. This is obviously a very slow progression given the considerable range of applications of plastic materials, but that needs to continue uninterruptedly with a view to achieving the substitution of the latter in those circumstances in which it is possible to do so.

In fact, efforts are being made in some productive sectors to replace, as far as possible, plastic materials with others that are less polluting and therefore less harmful to the environment. As an example, mention can be made of National Patent document P-202030083 owned by the same applicant of the present invention and considered as the closest prior art to the present invention, in which a bag for containing and transporting products, especially products belonging to the horticultural sector, is developed. The bag described in said document takes as its starting point a paper band intended to be fragmented into portions which, when folded on themselves, make it possible to obtain the bags mentioned, with the particularity that the paper band includes openings for breathing and sighting the products which may be contained therein, these openings being closed by means of mesh portions also made of paper, which must be trimmed with dimensions that adapt to the size of the openings, and which for the fixing of each of the mesh portions on a respective opening it is necessary to carry out a series of operations such as prior application of a gluing product on a perimeter stretch surrounding the opening to which the mesh portion is to be applied, applying the previously segmented mesh to the appropriate size on the glued area, and finally applying a paper frame which has also been previously prepared with the aid of a suitable process, the frame of which encloses an internal opening of the size of the same opening to be covered with the mesh, and so that it is attached on the perimeter area of said mesh by virtue of the same gluing product initially applied around the corresponding opening and which is filtered through the holes of the same mesh.

This solution is considered to be very effective for providing paper bags for predetermined applications, and represents a very considerable contribution to the replacement of the plastic material from which these bags have traditionally been manufactured. However, in spite of the advantages it brings with respect to the prior art, the process of elaboration of the paper band for the manufacture of the bags described in said document can be improved with a view to a saving of time and means for obtaining said band, and therefore with a view to the cheapening and streamlining of the productive process.

This objective constitutes the object of the present invention, as will be explained below.

BRIEF DESCRIPTION OF THE INVENTION

In accordance with the foregoing exposition, the present invention has developed a method for the manufacture of a paper band specially intended for the manufacture of bags for the packaging and transport of articles, such as horticultural products for example, so as to allow, with a view to replacing at least in that sector and to the greatest extent, the traditional plastic bags and thus contribute to an improvement of environmental conditions and to the reduction of pollution in general.

For this purpose, the invention provides a paper band for the manufacture of bags that are sufficiently strong for a user to transport the articles deposited inside the same in complete safety, as has been said preferably, but not exclusively, horticultural products, the band of which is equipped with multiple openings or windows for ventilation and inspection of the articles contained inside the same that can be closed by covering with a suitable paper mesh, but with the particularity that the mesh portions which are applied respectively to the various openings or windows of the paper band are obtained from a mesh with a composite structure, in which each of such mesh portions is supplied already integrated with the respective paper frame thereof which will surround the opening or window and which it reinforces, all this made in such a way that said composite structure is dimensioned in accordance with the width dimensions of the openings or windows and can therefore be fragmented in height with automated means, with the consequent saving of time and human intervention, and therefore with the consequent saving of production costs.

The composite mesh includes a support base made up of two longitudinal paper strips, arranged parallel to each other and separated by a distance according to the dimensions of the windows to be covered, these two longitudinal paper strips being joined together by means of a multiplicity of paper strips that serve as cross pieces, bonded to the longitudinal strips by gluing, arranged successively along said longitudinal strips keeping a separation distance between adjoining cross pieces also of predetermined magnitude and logically according to the dimensions of the windows or openings to be covered, logically in accordance with the dimensions of the windows or openings to be covered, so as to obtain a support base structure with a grid shape, and on which is then applied, also by automated means, a paper mesh which may eventually include reinforcing fibres, such as natural fibres or even optionally, in some applications, consisting only of natural fibres (e.g. bamboo or cotton), and which is attached to said support base by gluing to the longitudinal strips and to the transversal strips (also referred to interchangeably as cross pieces). With the composite paper mesh thus obtained, the various grids that are made up by the support base and the paper mesh applied on the latter, can be cut by means of an automated process, obtaining fragments of the exact size that is required for the covering of the windows or openings included in the paper band for bags being prepared.

BRIEF DESCRIPTION OF THE DRAWINGS

These and other features and advantages of the invention will become more apparent from the detailed description of a preferred embodiment thereof that follows, which is given solely by way of illustration and not limitation and refers to the accompanying drawings, wherein.

DESCRIPTION OF A PREFERRED EMBODIMENT

As mentioned previously, the present invention is intended to provide a paper band with a composite paper mesh for the preparation of a paper band of the type commonly used for the provision of band sections with which to shape unit bags intended for the transport and packaging of products, preferably horticultural products. It should be clarified that the process of shaping the bags from the paper band with composite paper mesh does not in itself form part of the present invention because it is already known, the process of the present invention being therefore intended solely for the provision of said band with composite mesh, with all the advantages of preparation which have been mentioned in the foregoing section and which will be explained in greater detail in what follows.

Figure 1:
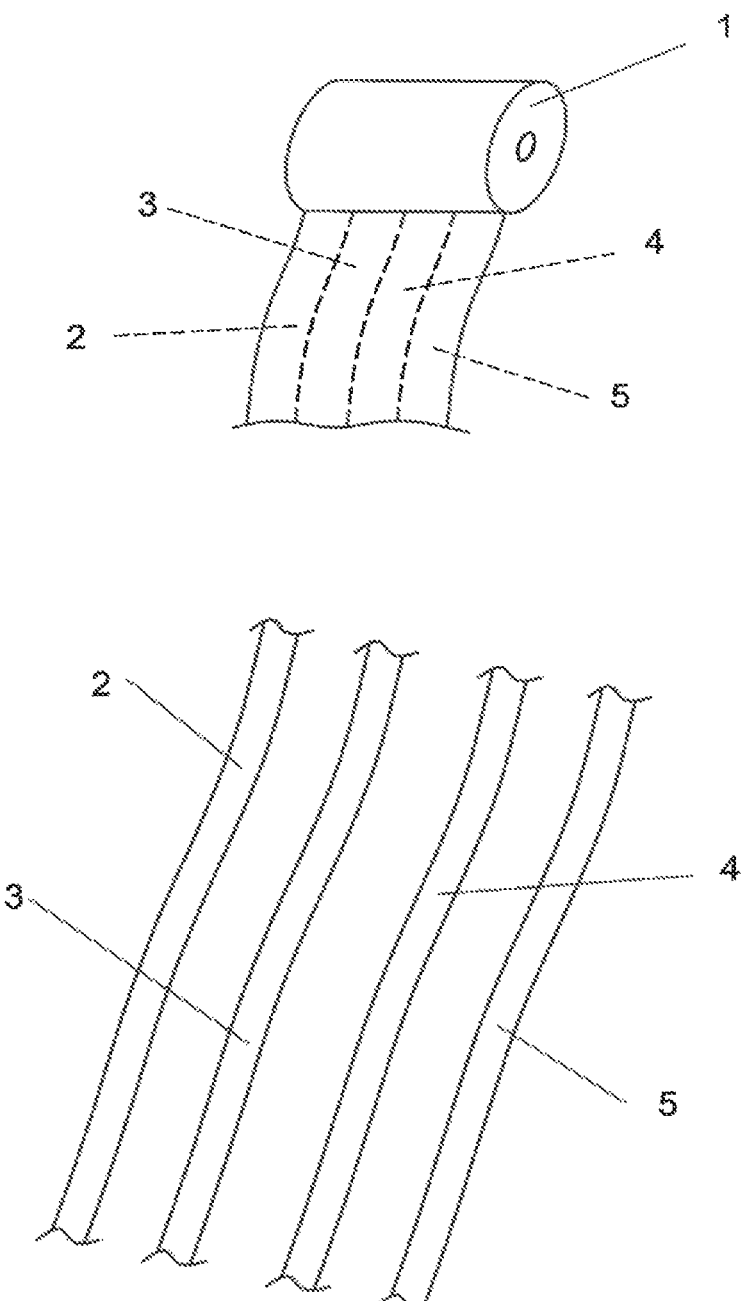
FIG. 1 is a schematic view of a group of continuous longitudinal strips obtained in a first step of the process by longitudinal cutting of a paper reel.

For this purpose, the various steps of the process of making the paper band equipped with composite mesh portions have been shown graphically, for illustrative purposes only, in the drawings appended to the present description. Thus, as shown in FIG. 1, an initial phase of a method for preparing a support base to obtain the composite mesh can be seen. Said figure represents a paper reel 1. Said reel, with predetermined dimensional characteristics, is subjected in this first phase of the method to longitudinal sectioning to obtain a multiplicity of continuous longitudinal strips 2, 3, 4, 5, of pre-established width. It will be understood that depending on the intended width of the strips 2-5, the number of these strips obtained from the paper reel 1 will be variable depending on the width of said paper reel 1.

Preferably, the operation of longitudinal cutting of the paper sheet supplied from the paper reel 1 is carried out with the aid of automated means which, although not part of the invention, constitute an essential element for streamlining the process and achieving a high uniformity as far as the width of the longitudinal cut of the continuous strips is concerned.

In a preferred embodiment, the width of the strips 2-5 may be around 2 cm, but this measurement is only illustrative of one of the possible preferred embodiments and may vary within wide ranges depending on the desired characteristics of the final bag.

Figure 2:
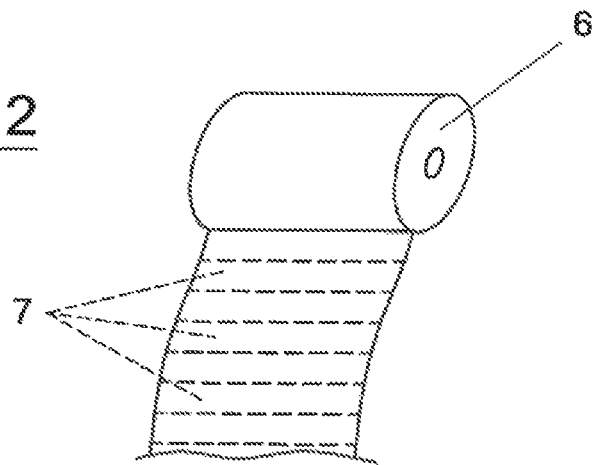
FIG. 2 is a schematic view of a paper reel intended to be subjected to a cross-sectioning step for the provision of paper cross pieces.

FIG. 2 schematically shows a second paper reel, identified with the numerical reference 6, intended to provide elements which in the present description have been denominated with the term cross pieces, and which are obtained by transversely sectioning the paper sheet supplied from the reel 6. These cross pieces have been indicated with the numerical reference 7, and consist of strips the length of which is determined by the width of the paper sheet of the reel 6, and wherein the width of each cross piece is a previously established parameter according to the strength characteristics to be transferred later to the band for the manufacture of the final bag.

Figure 3:
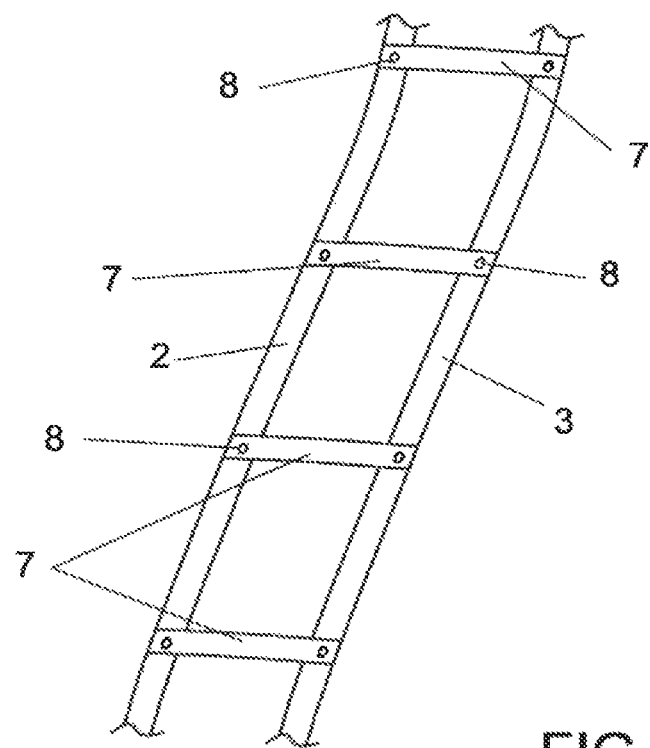
FIG. 3 is a schematic view of a support base grid structure, obtained by combining the cross pieces of FIG. 2 and the longitudinal strips of FIG. 1.

From the continuous longitudinal strips in FIG. 1 and the transversal fragments or cross pieces shown in FIG. 2, it is possible to make up a grid structure that will serve as a support base for the composite mesh of the present invention. This grid support base is schematically represented in FIG. 3, and consists of the bonding of two longitudinal strips, for example those indicated with the references 2, 3 (or any others), and a multiplicity of cross pieces 7 extended between both longitudinal strips 2, 3. The dimensional characteristics of the grids are logically determined by the spacing between the longitudinal strips 2, 3 and the distance between each two consecutive cross pieces 7. The quadrangular space of each of the grids corresponds to the size of the respective opening or window to which the paper band 11 (FIG. 5) is to be applied at another step of the process, as will be described below.

Preferably, the configuration of this support base grid structure is obtained with the aid of automated means that successively incorporate the cross pieces 3 on the longitudinal strips 2, 3 that laterally delimit said support base. The bonding between longitudinal strips 2, 3 and cross pieces 7 is performed by gluing the portions of both ends of the cross pieces 7 that overlap on the longitudinal strips 2, 3. Preferably, this gluing operation is also part of the automated process mentioned above.

Figure 4A:
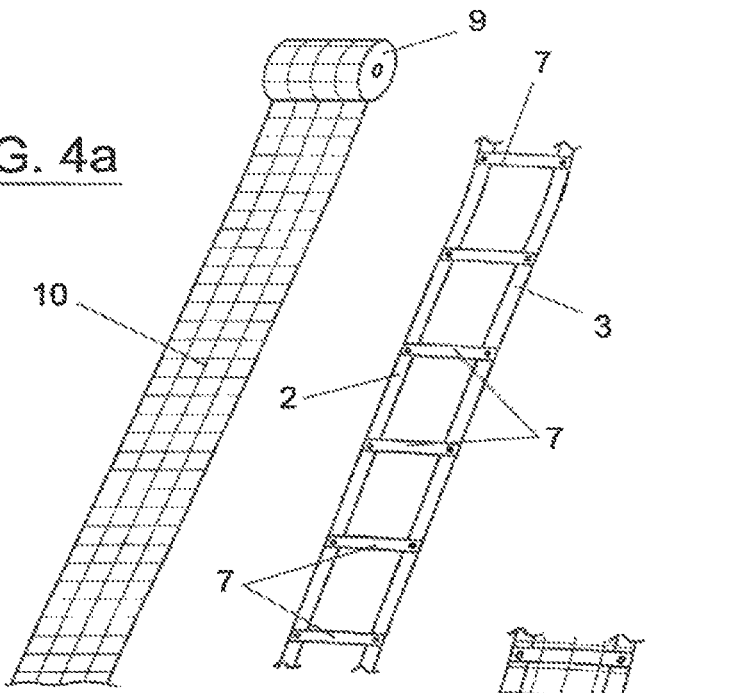
FIG. 4a schematically illustrates a step for applying a paper mesh to the grid structure of FIG. 3 to obtain a composite paper mesh.
Figure 4B:
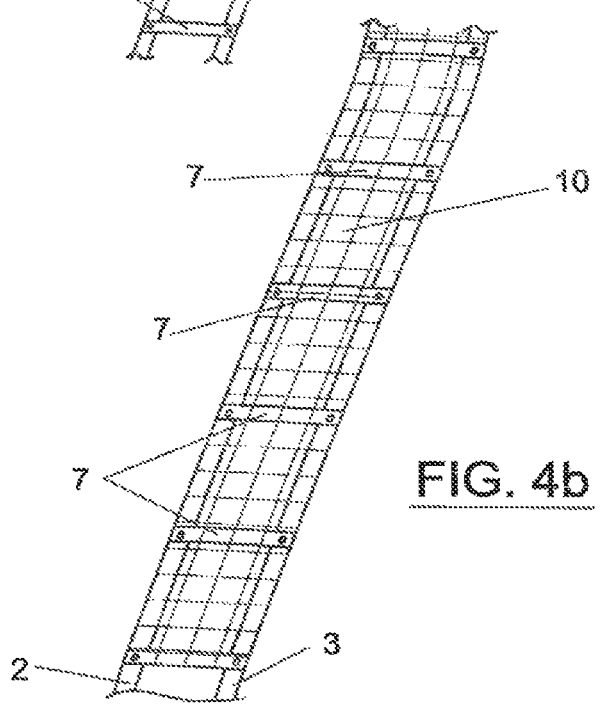
FIG. 4b illustrates a schematic view of the composite paper mesh obtained by the process step shown in FIG. 4a, and FIG. 5 is a schematic view of the application of composite paper mesh sections to openings or windows included in a paper band intended for the manufacture of bags.
Figure 5:
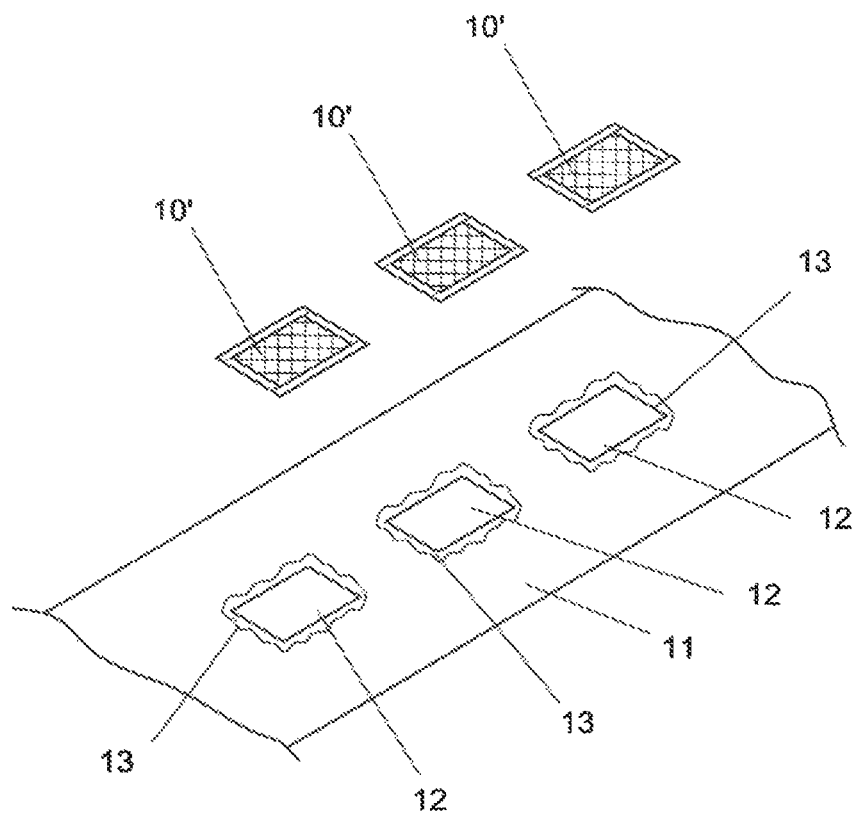

Once the grid structure of FIG. 3 has been obtained, a next phase of the method for obtaining the composite mesh is executed, which consists essentially in the application and gluing of a mesh, generally made of paper yarn with incorporated natural fibres or which could eventually possibly consist only of natural fibres (bamboo or cotton), as appropriate, on the support base provided by said grid structure. This phase of the process is shown in FIG. 4a, which graphically illustrates the grid structure delimited by both longitudinal strips 2, 3 and made up of a multiplicity of essentially quadrangular grids. On this structure, the paper yarn mesh indicated with the numerical reference 10, continuously supplied from a reel 9, is applied and said paper yarn mesh is bonded by gluing to the components (lateral strips and cross pieces) of the support base. This process is also carried out with automated means, and allows obtaining a composite mesh as shown in FIG. 4b. Said composite mesh can now be automatically fractionated into portions by cutting through the cross pieces 7 to obtain separate portions which in FIG. 5 are shown individually and indicated with the numerical reference 10'. As has been said, the dimensions of each of the grids of the support base of the composite mesh are in accordance with the dimensions of the openings or windows 12 included in the paper band 11 provided for the manufacture of the bags, it will therefore suffice to divide said composite paper mesh following the positions of the cross pieces 7 to obtain the aforementioned individual portions 10' of composite mesh and apply them directly on respective windows or openings 12 included in said band 11, attaching them as usual with the aid of a perimeter strip 13 of glue.

As will be understood, the obtaining of the composite mesh for the closing or covering of the windows or openings 12 of a paper band 11 intended for the manufacture of bags is extremely easy and fast due to a particularly suitable conception for the use of automated mechanisms that can be used both in the construction of the composite mesh and in the fractioning and application of the various portions to the respective windows or openings 12 included in the paper band 11 used for the manufacture of the bags.

Based on the foregoing, it should be noted that the composite mesh provided by the present invention has very advantageous structural characteristics for conferring stability to the openings 12 of the paper band 11, and strength for supporting the weight of the transported products, in addition to allowing, as is usual, that the products contained inside the bags can be ventilated and observed from the outside through the holes in the same mesh 10.

INDUSTRIAL APPLICABILITY

As is clear from the above description of a preferred embodiment, the invention is particularly applicable in the industrial sector dedicated to the manufacture of paper bags, especially paper bags for packaging and transporting products belonging to the horticultural sector.

It is not considered necessary to extend the contents of this description for a person skilled in the art to understand its scope and the advantages derived from it, as well as to carry out the practical embodiment of its object. Notwithstanding the foregoing, those skilled in the art will be able to understand and determine that within the essence of the invention, multiple variations in detail may be introduced, which may affect the shapes, dimensions and sizes, without thereby departing from the scope of the invention as defined by the attached claims.

The invention claimed is:

1. A method for preparing a paper band with a composite paper mesh, for use in the manufacture of bags, the paper band of those which are used for the manufacture of bags intended for the packaging and transport of products of any kind and products belonging to the horticultural sector, which paper band includes openings or windows that can be covered or closed by means of a mesh portion bonded to the same paper band by means of a glue stretch that surrounds perimetrically the aforementioned opening or window the method of preparing a composite mesh that can be divided into such portions for application to the windows of the paper band, comprises:

dividing the sheet of a paper reel into a variable number of continuous longitudinal strips of paper of a width in accordance with the desired final strength and with the aid of automated cutting means;

dividing the sheet of a paper reel into transversal fragments that make up cross pieces, with a width in accordance with the desired final strength and with the aid of automated cutting means;

applying the aforementioned cross pieces on two longitudinal strips, parallel and separated from each other by the length of the cross pieces, occupying positions spaced along such longitudinal strips separated consecutively by distance in accordance with the dimensions of the windows to be covered, and performing, with the aid of automated means, the bonding between the cross pieces and the longitudinal strips by gluing the respective end portions of said cross pieces superimposed on both longitudinal strips, so as to obtain a grid structure that makes up a support base;

applying on said support base grid structure a mesh of paper yarn obtained continuously from a reel, of a width equivalent to that of said support base grid structure, and bonding said mesh of paper yarn to the grid structure by applying a glue, with the aid of automated means, to obtain a composite mesh;

dividing said composite mesh into portions on the basis of the positions occupied by the respective cross pieces, and finally, applying the portions of composite mesh to each respective one of the windows formed in the band, for the covering thereof, the bonding between the portions of composite mesh and the band being performed by virtue of a glue stretch that surrounds perimetrically each of said openings or windows.

2. The method according to claim 1, wherein, the width of the longitudinal strips of paper is of the order of 2 cm.

3. The method according to claim 1, wherein the mesh of paper yarn may consist of paper yarn that is twisted with natural fibers.

4. The method according to claim 1, wherein the mesh of paper yarn may be solely made up of natural fibers comprising bamboo or cotton.

5. A composite paper mesh for use in the preparation of a band intended for the manufacture of paper bags with the execution of a method according to claim 1, the composite paper mesh comprising:
- a support base made from two longitudinal strips of paper, continuously obtained from a reel of paper sheet, which laterally delimit said support base and a multiplicity of cross pieces of paper obtained by transversal fragmentation of a reel of paper sheet with a previously defined width, bonded to both longitudinal strips in longitudinally separated adjoining positions and bonded to the latter by means of gluing, and
- a mesh made of paper yarn applied on said support base grid structure and attached to the latter with the application of a glue.

6. The composite paper mesh according to claim 5, wherein the mesh of paper yarn includes paper yarn with natural fibers or only natural fibers of bamboo or cotton.

\* \* \* \* \*